Sept. 29, 1959     E. UMRATH     2,906,937
ADJUSTABLE ELECTRIC BRAKING CIRCUIT FOR SERVO-MECHANISM
Filed Dec. 24, 1956
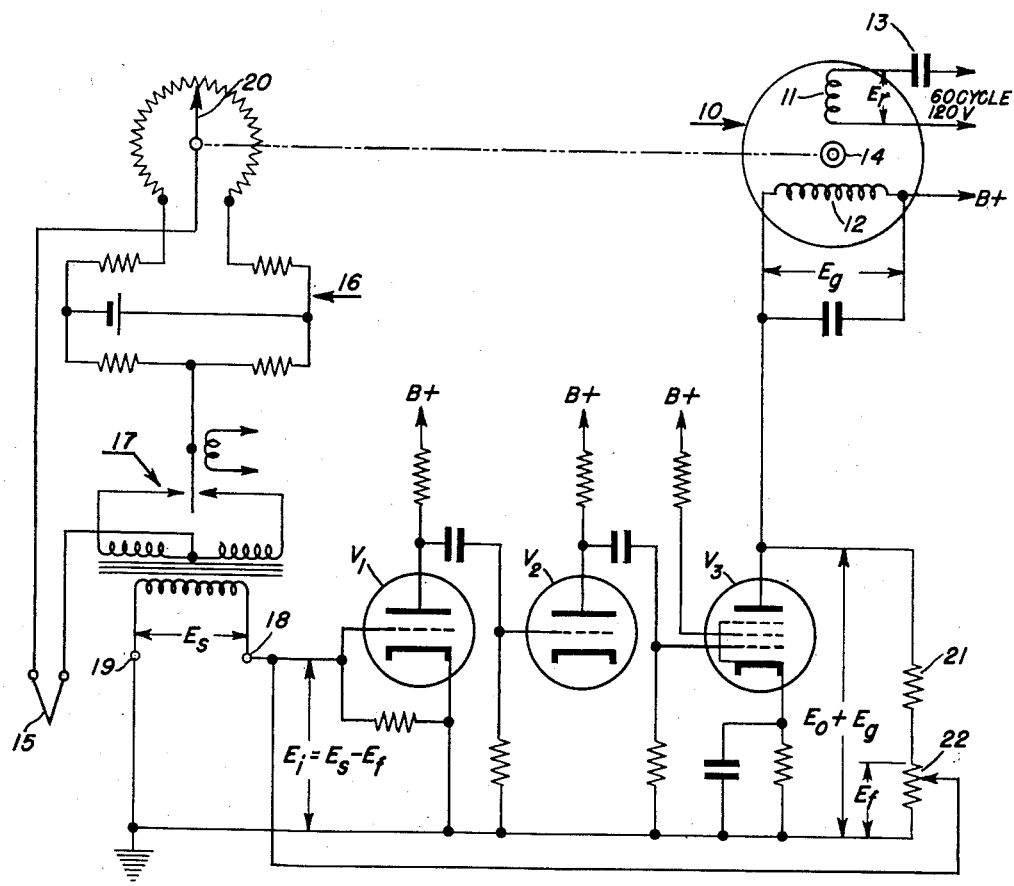
ERNST UMRATH
INVENTOR.
BY
Rudolph J. Junick
ATTORNEY

United States Patent Office 2,906,937
Patented Sept. 29, 1959

2,906,937

ADJUSTABLE ELECTRIC BRAKING CIRCUIT FOR SERVO-MECHANISM

Ernst Umrath, North Plainfield, N.J., assignor, by mesne assignments, to Daystrom, Incorporated, Murray Hill, N. J., a corporation of New Jersey Application December 24, 1956, Serial No. 630,200

6 Claims. (Cl. 318—448)

This invention relates to improvements in servo-mechanism, such as automatic recording and control systems, and more particularly to an adjustable, electrical braking arrangement to prevent the overshoot of the corrective member of a servo-mechanism as it approaches the balance point of the system.

Although of general application to any system wherein a follow-up member is motionally responsive to changes in a transmitted condition, the invention will be described specifically with reference to a self-balancing potentiometric recorder. Such apparatus is used to record the changes in the magnitude of a condition, such as physical, chemical, mechanical, electrical, and may include control members for maintaining the condition at a preselected value or level. Briefly, in apparatus of this class, a change in the measured condition unbalances a normally-balanced electrical network, and such unbalance initiates operation of a corrective system to effect a rebalancing action. The corrective system is driven by a reversible, two-phase motor which is mechanically coupled to the slide wire contact of a potentiometer forming part of the electrical network. Due to the mass of the mechanical transmitting train, inertia will cause the system to hunt or oscillate about the balance point, particularly in a high speed system. Consequently, it is necessary to provide means for braking the motor without, at the same time, reducing the speed at which the network is rebalanced.

An object of this invention is the provision of an adjustable electrical, braking arrangement to prevent overshooting and/or hunting of the corrective member of a servo-mechanism as it approaches the balance point of a system of which the mechanism is a part.

An object of this invention is the provision of electrical braking means for the rebalancing motor of a self-balancing potentiometric recorder and/or controller, said means including as an element thereof a winding of the motor.

An object of this invention is the provision of an adjustable, electrical braking arrangement for preventing overshooting of the rebalancing system in a high speed self-balancing, potentiometer of the type including a two-phase motor having one winding connected in the anode circuit of an electron tube forming the last stage of an amplifier, said braking arrangement comprising a shunt circuit connected across the anode and cathode of the said tube and an adjustable connection between the said shunt circuit and the control electrode of a tube forming a preceding stage of the amplifier.

These and other objects and advantages will become apparent from the following description when taken with the accompanying drawing which is a wiring diagram of a motor braking arrangement made in accordance with the invention.

Referring now to the drawing, the electron tubes $V_1$, $V_2$, and $V_3$, constitute an electronic amplifier, the latter being a power tube which drives the motor 10. The motor 10 is a two phase rotating field motor having a pair of windings 11 and 12 disposed at an angle of 90 degrees to each other. The reference winding 11 is connected to a 120 volt, 60 cycle power line in series with the capacitor 13 and the control winding 12 is connected between the positive terminal of a plate voltage source and the anode of the tube $V_3$. The amplifier is so arranged that the currents flowing through the motor control winding 12 are either in phase or out of phase with the power line voltage. Due to the action of the capacitor 13, the current flowing through the reference winding 11 will lead the power line voltage by 90 degrees. Consequently, when both windings are energized the magnetic field generated by the windings will be displaced 90 electrical degrees with the result that a rotating field is provided in one direction or the other and the rotor 14 will rotate in a corresponding direction.

In the case of a self-balancing, potentiometric recorder for recording temperature, the changes in temperature are normally sensed by a thermocouple 15. Such thermocouple develops a D.-C. voltage which varies directly with changes in the temperature and the thermocouple voltage is bucked against the voltage developed across two points of a measuring network 16 forming part of the recorder. When these two voltages are equal the system is in balance. However, upon a change in the voltage developed by the thermocouple the system becomes unbalanced and a corrective action automatically becomes effective to rebalance the system at a new level. The unbalance voltage, that is, the voltage difference between the thermocouple and the measuring network, will be of a sign and amplitude determined by the direction and extent of the change in temperature. Such unbalance voltage is converted, by means of a conventional vibrator, or chopper 17, to a corresponding A.-C. voltage which is impressed on the input circuit of the amplifier.

In the drawing, such unbalance voltage appears across the amplifier input terminals 18, 19 and is designated $E_s$. The unbalance voltage $E_s$ is amplified by the tubes $V_1$, and $V_2$ and is impressed on the control grid of the output tube $V_3$ causing a current to flow in the motor control winding 12. Depending upon the direction of the change of the thermocouple voltage in the first instance, the signal applied to the control grid of the tube $V_3$ is such that the current flowing through the motor winding 12 is either in phase or out of phase with the power line voltage and, hence, 90 degrees leading or lagging relative to the current flowing continuously through the motor winding 11. Therefore, the rotor 14 rotates in one direction or the other, the particular direction of motor rotation being such that the potentiometer slider 20 will adjust the measuring network voltage to exactly balance the new voltage of the thermocouple.

The specific temperature measuring system, above described, may take one of several specific forms well known in the recorder art. Further, it is pointed out that the invention is not limited to such specific application but, rather, is applicable to any servo-type system wherein a motor is required to rotate in one direction or the other to rebalance a system in response to the directional and magnitude change of an applied signal.

When once set into rotation, the motor 10 and the mechanical train operated thereby normally develops considerable inertia, particularly in a high speed system. Consequently, the motor rotor will continue to rotate beyond the point where a new system balance is obtained. Such overshooting of the balance point brought about by the inertia of the mechanical components results in a network unbalance in a reverse sense thereby producing a certain amount of objectionable system hunting.

It is well known that a two phase motor of the type described functions as a rate generator. Specifically, with the reference winding 11 energized by a supply voltage of fixed frequency, the voltage $E_r$, across such winding, will produce a voltage $E_g$ across the control winding 12 by inductive coupling, the coupling medium being the rotor. The voltage $E_g$ will be zero with a stalled rotor and will increase to some saturation magnitude at full speed rotation of the rotor. Up to the saturation point, the voltage $E_g$ is proportional to the speed of rotation of the rotor, its frequency being the same as that of the voltage $E_r$ and displaced in phase either 0 or 180 degrees depending on the direction of rotor rotation. Thus, $E_g$ may be considered as a rate signal voltage.

I utilize the voltage induced in the motor control winding 12 to provide proper braking of the motor thereby providing critical damping of the corrective member of a servo-loop such as, for example, the rebalancing components of a self-balancing recording potentiometer. This is accomplished by feeding back a portion of the motor-induced voltage to preceding amplifier stage in a sense opposed to the normal control signal appearing at such stage. Specifically, the fixed resistor 21 and the adjustable resistor 22 are connected across the output circuit of the power tube $V_3$ with the adjustable tap of the resistor 22 connected to the control grid of the tube $V_1$.

When the system is in balance, the unbalance, or error, signal $E_s$ is zero, the amplifier output voltage $E_o$ is also zero, and the motor 10 is stalled. With the motor stalled, the induced voltage $E_g$ is also zero. The feedback voltage component $E_f$, being a portion of $E_o + E_g$ is zero and the voltage $E_i$ applied to the grid of the tube $V_1$ is also zero since $E_i$ is the algebraic sum of $E_s$ and $E_f$.

If now, an error signal $E_s$ appears on the grid of the tube $V_1$, the amplifier output voltage $E_o$ increases and reaches a saturated value. The motor is caused to rotate at full speed and a saturated rate signal voltage $E_g$ is generated across the motor winding 12, such voltage being superposed on the voltage $E_o$. A portion of the combined voltages $E_o + E_g$, namely, voltage $E_f$, is fed back to the grid of the tube $V_1$ and such voltage $E_f$ is 180 degrees out of phase with the error signal voltage $E_s$. Consequently, the voltage effective on the grid of the tube $V_1$ is $E_i = E_s - E_f$. The magnitude of $E_f$ is chosen so as to permit saturation of the system at a relatively low value of $E_s$. Under such conditions, the feedback component $E_f$ is not effective and the motor will drive the slider of the potentiometer, or other corrective member of the servo-loop, at full speed.

As the new balance point of the system is approached, the input, or error, signal $E_s$ decreases and will reach the saturation level of the amplifier. From this point on the amplifier output voltage $E_o$ decreases very rapidly in proportion with the decrease in the input signal $E_s$. The important function resulting in the motor braking action now takes place in that the induced voltage $E_g$ does not decrease at the same rate as $E_o$. Although the amplifier output voltage decreased sharply, the high moment of inertia of the motor rotor, and the associated mechanical components, will cause the rotor to continue full speed rotation for some time after the amplifier voltage $E_o$ has decreased substantially below the motor drive voltage. At some point within the unsaturated range of the amplifier, but before the new balance point of the system is reached, the induced voltage $E_g$ exceeds the amplifier output voltage $E_o$ and a portion of such voltage, namely, $E_f$ becomes effective on the grid of the tube $V_1$. Also, the voltage $E_g$ (and correspondingly $E_f$) decreases slower than the input signal $E_s$ as the latter falls below the saturation point of the amplifier. Thus, at some instant just prior to the new balance point, $E_f$ will be greater in magnitude than $E_s$ whereupon the effective voltage $$E_i = E_s - E_f$$

effective on the grid of the tube $V_1$, will be of reversed polarity. Such reversal of the grid voltage will produce a reverse output voltage ($-E_o$) of the amplifier which, in turn, tends to reverse the direction of motor rotation. The voltage $E_f$, therefore, is a rate feedback voltage and by adjusting its magnitude with respect to the inertia factor of the movable components of the system, a desired braking action may be had. Such braking action may be adjusted to critically damp the system, whereby the motor and the associated mechanical train of components will come to rest without overshooting the balance point of the system and without a significant loss in the speed at which the system will rebalance. In short, the system can be adjusted to a degree such that neither overshoot nor creep-in is visible. These features are obtained without requiring additional power output from the amplifier and without the use of networks which inherently introduce a high noise level in the amplifier. Further, the feedback, or damping current, is of relatively high impedance, whereby the feedback voltage and the error signal voltage can be applied to the single control grid of a triode tube constituting any intermediate stage of the amplifier.

For simplification, the drawing shows a three tube amplifier. It will be apparent, however, that the input terminals designated 15 and 16 may actually be corresponding points at some intermediate stage of an amplifier having a greater number of tubes. The magnitude of the voltage $E_s$, appearing at such points in the amplifier, will depend upon the number of amplification stages preceding such points. In such case, the magnitude of the feedback voltage $E_f$ is adjusted to provide the necessary braking action. It will be apparent that the feedback voltage may be applied to the control grid of any tube in the amplifier chain provided only that at such stage the error signal voltage and the feedback voltage are of opposite phase.

Having now given a detailed description of the invention, what I desire to protect by Letters Patent is set forth in the following claims.

I claim:

1. An improved electrical braking arrangement for an electric motor of the type having a first winding energized by a source of A.-C. reference voltage and a second winding energized by the voltage output of the last stage of an amplifier, said arrangement comprising means developing a resultant voltage that is the sum of the amplifier output voltage and the voltage induced in the said second winding upon motor rotation, and circuit elements directly impressing an adjusted portion said resultant voltage on the control grid of an intermediate stage of the amplifier in reverse sense to the normal control voltage applied to such grid.

2. The invention as recited in claim 1 including means to adjust the magnitude of the said resultant voltage impressed on the said control grid.

3. An improved electrical braking arrangement for an electrical motor of the type having a first winding energized by a source of A.-C. reference voltage and a second winding energized by the voltage output of a multi-stage amplifier, said arrangement comprising a resistance connected across the output electrodes of the last amplifier stage, and an adjustable tap directly connecting the said resistance to the control grid of an intermediate stage of the amplifier.

4. In a servo-system of the class wherein an A.-C. error voltage is amplified to cause rotation of a motor in one direction or the other in correspondence with the variation of the error voltage above or below a predetermined level; the improvement comprising a resistor connected across the output electrodes of the amplifier tube driving the motor, and circuit elements directly impressing an adjusted portion of the voltage drop across said resistor on the control electrode of a preceding amplifier tube.

5. In a servo-system the combination of a multistage, A.-C. amplifier, which saturates at a predetermined level of input voltage, a motor having a first winding connected to a source of A.-C. reference voltage and a second winding connected between the positive terminal of a D.-C. voltage source and the anode of the last amplifier stage, means impressing an A.-C. error voltage on the input of the amplifier, an adjustable resistor connected between the anode of the last amplifier stage and ground, and a lead directly connecting the adjustable tap of said resistor to the control grid of a preceding amplifier stage, the said tap being adjusted along said resistor so that the voltage appearing across the tap and ground exceeds in magnitude a predetermined level of the unsaturated conditions of the amplifier.

6. In a self-balancing potentiometric recorder of the type including an electrical network, means producing an unbalance voltage in said network, a device adjustable to reduce the unbalance voltage to zero, a motor having a winding for adjusting said device, a multistage amplifier responsive to the said unbalance voltage and having an output stage for selectively energizing said winding with current of one phase or opposite phase in accordance with the sense of said unbalance voltage; an improved arrangement for braking the said motor, said improved arrangement comprising means saturating the amplifier at a predetermined change in the magnitude of the said unbalance voltage, an adjustable resistor connected across the output electrodes of the amplifier output stage; and circuit elements to directly impress a selected portion of the voltage drop appearing across the said adjustable resistor to the control grid of a preceding stage of the amplifier, at which control grid the signal from the unbalance voltage is of opposite phase to that of the selected portion of the said voltage drop; the magnitude of said selected portion of voltage exceeding a predetermined level of the unbalance voltage under unsaturated condition of the amplifier.

References Cited in the file of this patent

UNITED STATES PATENTS

| | | |
|---|---|---|
| 2,252,007 | Jacobsen et al. | Aug. 12, 1941 |
| 2,286,337 | Bruck | June 16, 1942 |
| 2,692,358 | Wild | Oct. 19, 1954 |
| 2,692,359 | Ehret | Oct. 19, 1954 |
| 2,812,485 | Shieber | Nov. 5, 1957 |